June 1, 1937.  A. R. HAVENER  2,082,336
MECHANISM FOR TRANSMITTING MOTION
Filed Feb. 26, 1935  2 Sheets-Sheet 1
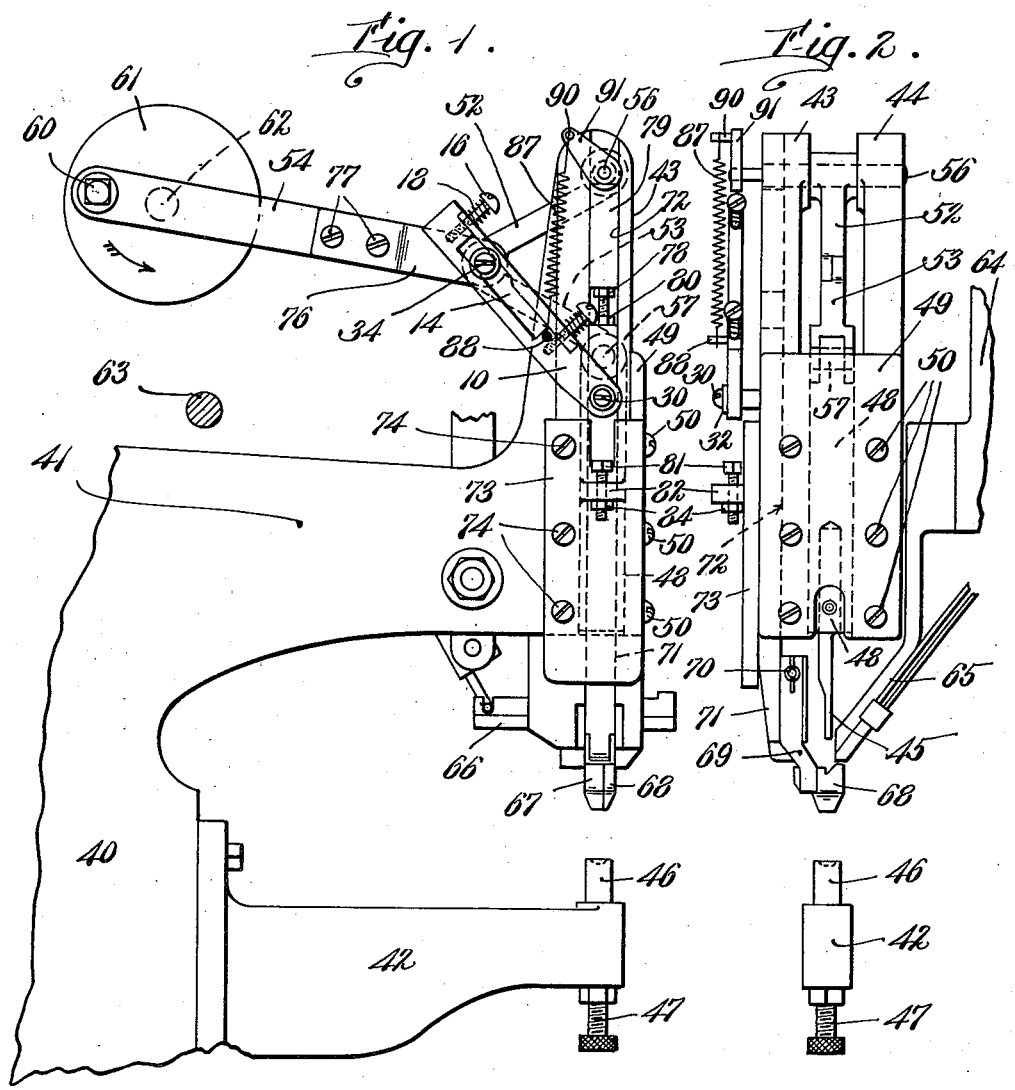
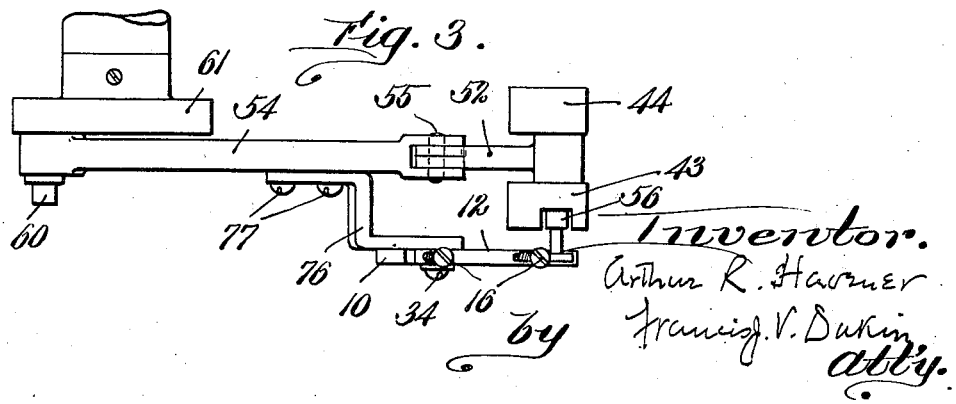
Inventor.
Arthur R. Havener
Francis V. Durkin
by  Atty.

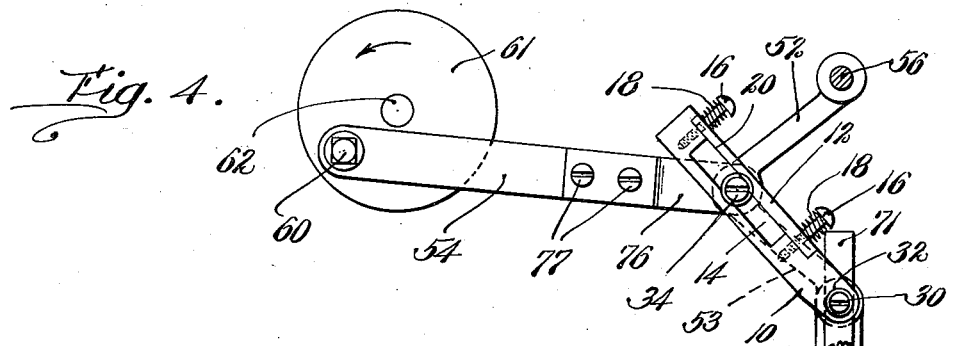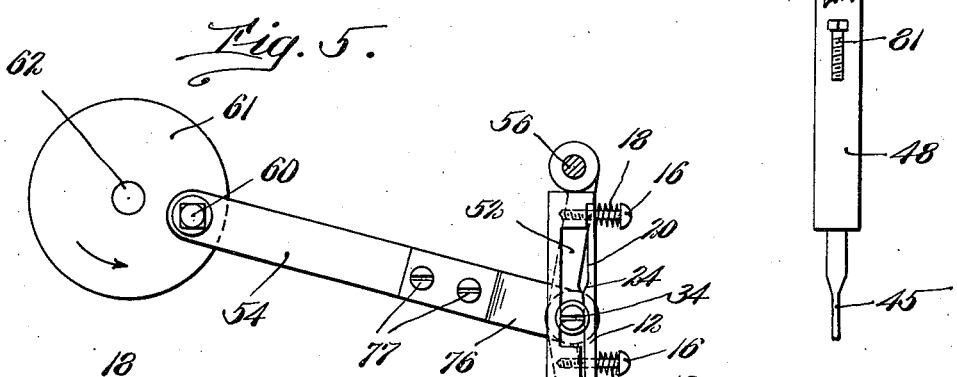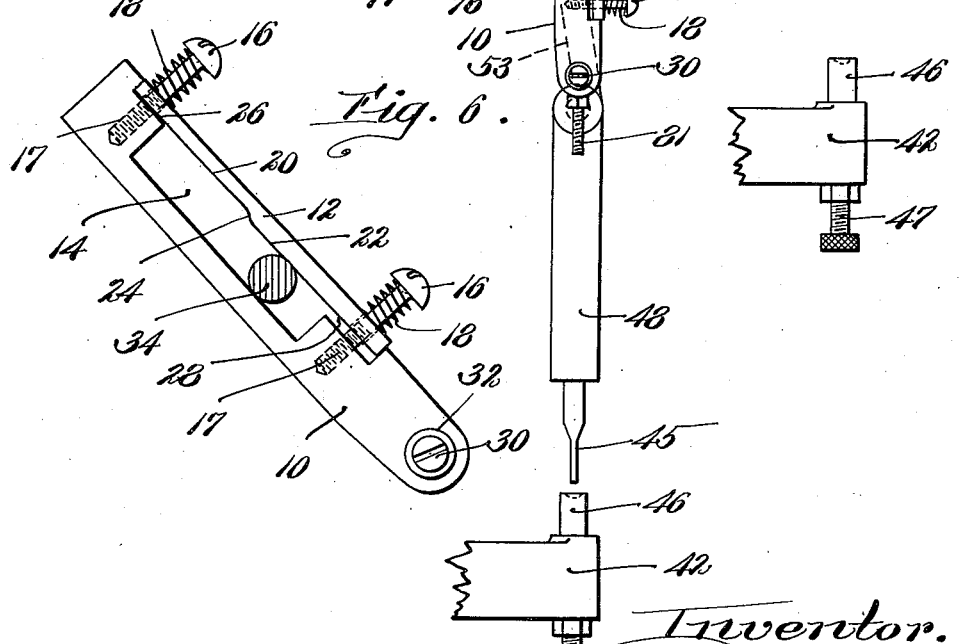

Patented June 1, 1937

2,082,336

UNITED STATES PATENT OFFICE 2,082,336

MECHANISM FOR TRANSMITTING MOTION

Arthur R. Havener, Wayland, Mass., assignor to Judson L. Thomson Manufacturing Company, Waltham, Mass., a corporation of Massachusetts Application February 26, 1935, Serial No. 8,308

22 Claims. (Cl. 74—40)

This invention relates to an improved mechanism for transmitting motion from a moving part to a movable part and, although designed particularly for use in riveting machines, it is capable of use in various other environments.

In the use of riveting machines, the rivet is generally fed from a hopper through a raceway to a holder comprising a pair of recessed blocks or jaws mounted on and held together by springs fastened to a holder slide and the rivet is driven out of the holder in the setting operation by a driver set in a slide; both the holder slide and the driver slide being mounted for vertical reciprocation. In the operation of the machine, the driver is first moved downwardly into close proximity to the head of the rivet in the holder, and the driver and holder are then moved downwardly in unison until the holder is close to the work when it stops and the driver continues and pushes the rivet out of the holder and through the work to complete the setting operation.

In adapting machines of this character to various kinds and conditions of work, it is necessary to vary the initial positions and length of strokes of the rivet driver and the rivet holder to suit those conditions. As a rule, the length of stroke of the former is more nearly uniform for all classes of work than the stroke of the latter, which may vary widely in different machines. Heretofore, it has been customary to control the vertical reciprocation of the rivet holders by means of suitable cams designed in each case to accomplish the desired result. This, of course, requires the construction of a multiplicity of differently shaped cams which are expensive to make because of the accuracy and care required since any error in the cam is multiplied in the machine.

The main object of the invention is the provision of a mechanism by which the transmission of motion from a moving part to a movable part may, as to the timing and duration of such transmission, be varied in different machines to adapt them to different classes of work.

Another object of the invention is the provision of a mechanism of the character described which is of simple and cheap construction, efficient in operation and which can be easily applied and adjusted to a machine to produce the desired result.

A further object of the invention as applied to riveting machines is to eliminate the use of cams for controlling the movement of the rivet holder and thereby materially reduce the cost of such machines.

Other objects of the invention will be in part obvious and in part described hereinafter.

In its broader aspect, my invention contemplates the provision for connecting the moving part to the movable part, of a member so constructed as to permit free movement of the moving part both before and after movement is transmitted to the movable part, the timing of the transmitted movement being regulated by varying, on the movable part, the point of connection of the said member thereto and the duration of said movement being controlled by a suitable stop adapted to be engaged by the movable part.

In its preferred form, my invention contemplates a connecting member in the form of a longitudinally slotted link pivotally connected at one end to the movable part and connected adjacent its other end to the moving part by a pin, or other connection, projecting into and adapted to slide in said slot. Said link is preferably made in two pieces, one of which comprises the main body portion of the link, and, the other, a bar yieldingly mounted on one side of said body portion for forming one side of said slot. The inner edge of the bar which constitutes one side of said slot is cut on two parallel, straight lines in offset relation to each other and joined together approximately midway the ends of the slot by an inclined edge which forms a shoulder. This produces a slot having two portions of different widths, the narrower portion being adjacent the movable part and the wider portion adjacent the moving part. The moving part connection adapted to slide in the slot is of lesser diameter than the enlarged portion of the slot so that it may move freely therein but is of greater diameter than the restricted portion of said slot so that it cannot enter that portion until it presses the bar outwardly which requires a force greater than that required to transmit movement to the movable part. In its operation, the moving part transmits no movement until the connection engages the shoulder, whereupon it transmits movement until the movable part engages the stop, whereupon further movement of the moving part develops sufficient force in the connecting member to move the bar outwardly and widen the slot so that the connecting member may enter therein to permit further movement of the moving part in relation to the movable part.

In the accompanying drawings, there is shown, for the purpose of illustrating the invention, one embodiment of the same adapted for and applied to riveting machines, in which Figure 1 is a side elevation of certain portions of a riveting machine of well-known construction showing my invention applied thereto with the parts in initial position;

Fig. 2 is a front elevation of the same looking from right to left in Fig. 1;

Fig. 3 is a top plan view, looking downwardly in Fig. 1;

Fig. 4 is a side elevation of the mechanism of my invention showing the parts in position for transmitting movement from the moving part to the movable part;

Fig. 5 is a similar view but showing the parts in their respective positions at the end of the movement in one direction; and Fig. 6 is a side elevation on an enlarged scale of the movement transmitting member.

Referring particularly to Fig. 6 of the drawings, there is shown a movement transmitting member in the form of an elongated plate link comprising a main body portion 10 and a resilient slot forming bar 12. The body portion has a longitudinal recess 14 opening out one side its full length which becomes a slot when the bar 12 is in position closing the open side of the recess. The bar is mounted loosely at its two ends on a pair of screw pins 16 threaded into the side edge 17 of the body portion 10 adjacent each end of the recess and a spring 18 mounted on each screw pin 16 and under compression holds the bar seated against the body portion. In order to vary the diameter of the slot 14 the inner edge of the bar is so formed as to present two straight edges 20 and 22 which are parallel but offset in relation to each other. These two edges are joined by an oblique edge 24 which acts as a shoulder. The body portion 10 may be recessed at 26 and 28 for receiving the two ends of the bar, the latter recess being somewhat deeper than the former so that the inner edges of the bar may be parallel with the opposite edge of the slot 14 when the bar is in seated position.

The link is, at that end adjacent the narrow end of said slot, pivotally connected to the movable part by any suitable means such as a pin 30 and washer 32 and at its other end to the moving part by a connecting element such as a pin 34 projecting into the slot 14. The diameter of the connecting pin 34 is less than the width of the wider portion of the slot 14 but is greater than the width of the narrower portion of the slot. The connecting pin will, therefore, slide freely in the wider portion of the slot but will not enter the narrower portion until sufficient force is exerted upon it to overcome the pressure of one or both of the springs 18 and to lift the bar from its seat. The pressure exerted by the springs upon the bar may be regulated by turning the screw pins 16 in one direction or the other.

By adjusting the pressure exerted by the springs 18 upon the bar 12 so that a greater force is required to lift the bar from its seat than to move the movable part, the continued movement of the moving part after the pin 34 engages the shoulder 24 will transmit movement to the movable part until such time as it encounters some obstacle to its further movement, such as a stop. At this point the further movement of the moving part will develop a force sufficient to raise the bar from its seat and to widen the narrow portion of the slot to permit the pin 24 to travel therein.

To illustrate the application and use of the mechanism of my invention, there is shown in Figures 1 and 2 certain parts of a riveting machine of well-known construction in which 40 indicates the frame of the machine adapted to be mounted on a base not shown and having an upper overhanging arm 41 and a lower laterally projecting arm 42 in alignment with the upper arm. The end of the upper arm is bifurcated to form two vertical arms 43 and 44 constituting the head of the machine.

Rivets of the well-known tubular type are, during setting operation, driven by a driver 45 through the work and clenched against an anvil 46 mounted in the end of the lower arm 42 and adapted to be adjusted vertically by a screw 47. The driver is fastened to a slide 48 mounted between and guided by the two vertical arms 43 and 44, which constitute ways therefor, the slide being held in place by a front plate 49 fastened to the arms by screws 50. For reciprocating the slide 48 vertically, a pair of toggle links 52 and 53 are pivotally connected to a connecting rod 54 by a pin 55. The toggle link 52 at its other end is fastened to a pin 56 rotatably mounted in the upper ends of the two arms 43 and 44 and the toggle link 53 is connected to the upper end of the slide 48 by a pin 57. The connecting rod 54 is pivotally connected at its opposite end to a crank pin 60 set in a crank disk 61 fastened to a shaft 62 which is adapted to be rotated by means not shown from a main shaft 63 to impart a vertical reciprocatory movement to the slide 48 and thereby to the driver 45.

Rivets are fed from a hopper 64 down a raceway 65 and are separated by a slide 66 to be fed into a rivet holder comprising two members 67 and 68 fastened each to a spring 69, said spring being secured by a bolt 70 to a holder slide 71 which is mounted to slide in a channel 72 in the outer face of the arm 43. A side plate 73 fastened to the arm 43 by screws 74 holds the slide in said channel.

Since the length of throw of the driver is approximately uniform in these machines, any slight difference in the length of stroke in different machines can be taken care of by varying the adjustment of the driver in the slide. The path of vertical reciprocation of the holder slide 71 carrying the holder, however, varies greatly both as to length and location in different machines; necessitated by the different kinds and conditions of work upon which those machines operate. By the use of a mechanism constructed in accordance with my invention, the path of movement of the holder slide may be so controlled as to effect different results in different machines without necessitating the use of cams.

In applying my mechanism to a machine of the type shown for transmitting movement from the connecting rod, the moving part, to the holder slide, the movable part, the link 10 is pivotally connected at one end by the pin 30 to the holder slide and at the other end is slidably connected to the connecting rod by the pin 34 which is carried in the end of an offset bracket 76 fastened to the said rod by screws 77. The pin 34 is so located that its axis is in alignment with the axis of the pin 55 by which the toggle links are connected to said rod.

For regulating the initial starting position of the holder slide 71 which differs in different machines, a screw stop 78 is threaded into the top face of said slide for engagement with the bottom end of a block 79 fastened in the channel 72, said stop being held in adjusted position by a set nut 80. The point at which the link is pivotally connected to the holder slide by the pin 30 will differ in different machines, dependent upon the amount of movement of the driver slide before the holder slide starts its downward movement and, therefore, it must be so connected that the connecting pin 34 is in engagement with the link shoulder 24 when the driver reaches its proper position in relation to the holder so that thereafter the two will move downwardly in unison.

The length of stroke of the holder slide is regulated by a screw stop 81 threaded through a projecting lug 82 on the side plate and held in adjusted position by a set nut 84, this stop being in a position to be engaged by the lower end of the link, which thereupon stops downward movement of the slide.

For returning the link and holder slide to starting position on the upward movement of the driver slide, a spring 87 is fastened at one end to a pin 88 set in the link and at its other end to a pin 90 carried by a short arm 91 which is fixed to the pin 56. This pin being fastened in the end of the toggle link 52 turns with it so the turning of the arm 91 tends to maintain constant the tension of the spring 87 on the link.

In the operation of the machine, the starting positions of the various parts are shown in Figure 1. In starting the machine, the rotation of the main shaft causes the crank disk 61 to rotate as indicated by the arrow. The preliminary movement of the crank disk through the connecting rods and toggle links causes the driver slide to move downwardly to bring the driver into close proximity with the head of the rivet to prevent its jumping out of the holder in the downward movement of the holder slide. At that point, as shown in Fig. 2, the pin 34 is in engagement with the shoulder 24 and further movement causes the link to move the rivet holder downwardly in unison with the driver slide. Since the force required to move the holder slide downwardly when there is no opposition to its movement is less than the force required to expand the slot in the link by movement of the bar against the springs, the downward movement of the rivet holder will continue until the end of the link engages the stop 81, whereupon the movement of the link and the holder slide ceases and the continued movement of the crank disk then develops sufficient force upon the pin 34 so that it forces the bar outwardly against the springs and enters the restricted portion of the slot, permitting further downward movement of the driver to push the rivet out of the holder and to set it in the work. At the conclusion of the setting operation, the parts are in the position shown in Fig. 5 and, thereupon, further rotation of the crank disk returns the parts to their initial position, the link being drawn upwardly by the spring 87.

It will be observed that, by the use of a mechanism made in accordance with my invention, the length of the path of movement of the movable part as well as the points of beginning and ending of said movement may be varied to a wide extent to suit many different conditions. Its use therefore, in machines of the character of riveting machines eliminates the use of expensive cams and enables those machines to be adapted at a lower cost to a wide variety of work.

Although I have, for the purpose of illustrating the application of the invention, shown and described it in connection with a riveting machine, it is not to be limited to such, since it is capable of a much extended use in various types of machines.

It is further to be understood that my invention is not to be limited to the precise form herein shown and described since it may be embodied in various other forms within the purview of the following claims.

What I claim is:

1. In a mechanism of the character described, a link having a longitudinal slot, one side of which is formed with two straight parallel edges in offset relation to each other to divide said slot into two longitudinal portions of different widths, said parallel edges being connected together by an oblique edge which serves as a shoulder and said side edge being so mounted as to yield to widen the narrower portion of said slot when sufficient pressure is exerted on said shoulder.

2. In a mechanism of the character described, a link having a longitudinal slot, one side of which is formed with two straight parallel edges in offset relation to each other to divide said slot into two longitudinal portions of different widths, said parallel edges being, approximately midway the ends of said slot, connected together by an oblique edge which serves as a shoulder and said side edge being so mounted as to yield to widen the narrower portion of said slot when sufficient pressure is exerted on said shoulder.

3. In a mechanism of the character described, an elongated plate link having a longitudinal slot, one side of which is formed with two straight parallel edges in offset relation to each other to divide said slot into two longitudinal portions of different widths, said parallel edges being connected together by an oblique edge which serves as a shoulder and said side edge being so mounted as to yield to widen the narrower portion of said slot when sufficient pressure is exerted on said shoulder.

4. In a mechanism of the character described, a link having a longitudinal slot adapted to receive in sliding engagement a member for connecting said link to a moving part, one side of said slot being formed with two straight parallel edges in offset relation to each other to divide said slot into two longitudinal portions of different widths, said parallel edges being connected together by an oblique edge which serves as a shoulder and said side edge being so mounted as to yield to widen the narrow portion of said slot when sufficient pressure is exerted on said shoulder by said connecting member, said link being adapted, at that end adjacent the narrow portion of said slot, to be pivotally connected to a movable part.

5. In a mechanism of the character described, a link comprising an elongated body portion having a longitudinal recess opening out one side of said body, the longitudinal edge of said recess lying in a single straight line, a bar resiliently mounted on said body portion for closing the open side of said recess to make it a slot, the inner edge of said bar being divided into two straight parallel edges offset in relation to each other and connected together by an oblique edge constituting a shoulder.

6. In a mechanism of the character described, a link comprising an elongated body portion having a longitudinal recess opening out one side of said body, the longitudinal edge of said recess lying in a single straight line, a bar resiliently mounted on said body portion for closing the open side of said recess to make it a slot, the inner edge of said bar being divided into two straight parallel edges offset in relation to each other to divide said slot into two longitudinal portions of different widths, said edges being connected together by an oblique edge constituting a shoulder.

7. In a mechanism of the character described, a link comprising an elongated body portion having a longitudinal recess opening out one side of said body, the longitudinal edge of said recess lying in a single straight line, a spring pressed bar mounted on said body portion for closing the open side of said recess to make it a slot, the inner edge of said bar being divided into two straight parallel edges offset in relation to each other and connected together by an oblique edge constituting a shoulder.

8. In a mechanism of the character described, a link comprising an elongated body portion having a longitudinal recess opening out one side of said body, the longitudinal edge of said recess lying in a single straight line, a spring pressed member mounted on said body portion for closing the open side of said recess to make it a slot, the inner edge of said member being divided into two straight parallel edges offset in relation to each other and connected together by an oblique edge constituting a shoulder.

9. In a mechanism of the character described, the combination with a moving part and a movable part, of a longitudinally slotted member for transmitting movement from the former to the latter, said member being pivotally connected at one end to said movable part and adjacent its other end to said moving part by a connection in sliding engagement with said slot, said slot having on one side an inwardly projecting edge forming a shoulder and restricting the width of said slot adjacent said movable part, said shoulder being adapted to be engaged by said sliding connection for imparting movement to said movable part and said side of said slot being yieldable to permit said sliding connection to enter the restricted portion of said slot after movement of said movable part has been stopped.

10. In a mechanism of the character described, the combination with a moving part and a movable part, of a member for transmitting movement from the former to the latter, said member being provided with a longitudinal slot having a restricted portion and a shoulder at the entrance to the restricted portion, said member being, at that end adjacent said restricted portion of said slot, pivotally connected to said movable part and, adjacent its other end, pivotally connected to said moving part by a connection in sliding engagement with the wider portion of said slot, said connection having a greater diameter than the width of the restricted portion of said slot in order to engage said shoulder for imparting movement to said movable part, and said shouldered side of said slot being yieldable to permit said sliding connection to enter the restricted portion of said slot after movement of said movable part has been stopped in order to permit further movement of said moving part.

11. In a mechanism of the character described, the combination with a moving part and a movable part, of a link for transmitting movement from the former to the latter, said link being provided with a longitudinal slot having a restricted end portion and a shoulder at the entrance to the restricted portion, said link being, at that end adjacent said restricted portion of said slot, pivotally connected to said movable part and, adjacent its other end, pivotally connected to said moving part by a connection in sliding engagement with the wider portion of said slot, said connection having a greater diameter than the width of the restricted portion of said slot in order to engage said shoulder for imparting movement to said movable part and said shouldered side of said slot being yieldable to permit said sliding connection to enter the restricted portion of said slot only after movement of said movable part has been stopped in order to permit further movement of said moving part.

12. In a mechanism of the character described, the combination with a moving part and a movable part of a longitudinally slotted member for transmitting movement from the former part to the latter part and means for stopping the movement of said movable part at a predetermined point, said slot being restricted in width at one end and having a shoulder on one side at the entrance to said restricted portion, said member, at that end adjacent the restricted portion of said slot, being pivotally connected to said movable part, and, adjacent its other end, being connected to said moving part by a connection slidably mounted in the wider portion of said slot, said connection being of greater diameter than the restricted portion of said slot and being adapted when in engagement with said shoulder to transmit movement from said moving part to said movable part, the shouldered side of said slot being resiliently mounted in order to yield to permit said connection to enter the restricted portion of said slot whenever movement of said movable part is stopped.

13. In a mechanism of the character described, the combination with a moving part and a movable part, of a member for transmitting movement from the former part to the latter part and means for stopping the movement of said movable part at a predetermined point, said member comprising an elongated body portion having an open longitudinal recess and a bar resiliently mounted on said body portion for closing the open side of said recess to make it a slot, the inner edge of said bar having a projecting portion forming a shoulder and restricting said slot at one end and said member, at that end adjacent the restricted portion of said slot, being pivotally connected to said movable part, and, adjacent its other end, being connected to said moving part by a connection slidably mounted in the wider portion of said slot, said connection being of greater diameter than the restricted portion of said slot and being adapted when in engagement with said shoulder to transmit movement from said moving part to said movable part, said bar being adapted to yield to permit said connection to enter the restricted portion of said slot whenever movement of said movable part is stopped.

14. In a mechanism of the character described, the combination with a moving part and a movable part, of a member for transmitting movement from the former part to the latter part and means for stopping the movement of said movable part at a predetermined point, said member comprising an elongated body portion having an open longitudinal recess, a bar mounted on said body portion for closing the open side of said recess to make it a slot and a spring for holding said bar seated, the inner edge of said bar having a projecting portion forming a shoulder and restricting said slot at one end and said member, at that end adjacent the restricted portion of said slot, being pivotally connected to said movable part, and, adjacent its other end, being connected to said moving part by a connection slidably mounted in the wider portion of said slot, said connection being of greater diameter than the restricted portion of said slot and being adapted when in engagement with said shoulder to transmit movement from said moving part to said movable part, said bar being adapted to yield to permit said connection to enter the restricted portion of said slot whenever movement of said movable part is stopped.

15. In a mechanism of the character described, the combination with a moving part, a movable part and a stop, of means for transmitting movement from said moving part to said movable part during an intermediate portion only of the cycle of movement of said moving part, said means comprising a link having a longitudinal slot divided into a restricted portion and a wider portion, said two portions being connected together by a shoulder on one side of said slot and said movable member being pivotally connected to said link at that end adjacent the restricted portion of said slot and connected to said moving member by a connection slidably mounted in the wider portion of said slot, said connection being of greater diameter than the width of the restricted portion of said slot in order to engage said shoulder for imparting movement to said movable part and said shouldered side of said slot being yieldable to permit said sliding connection to enter the restricted portion of said slot after movement of said movable part has been stopped by engagement with said stop.

16. In a mechanism of the character described, the combination with a moving part and a movable part, of means for transmitting movement from said moving part to said movable part during an intermediate period only of the cycle of movement of said moving part, said transmitting means including a slotted link connected at one end to said movable part and a connecting member mounted on said moving part and adapted to slide in said slot for connecting said link to said moving member.

17. In a mechanism of the character described, the combination with a moving part, a movable part and a stop for limiting the movement of said movable part, of means for transmitting movement from said moving part to said movable part during an intermediate period only of the cycle of movement of said moving part, said transmitting means including a slotted link connected at one end to said movable part and a connecting member mounted on said moving part and adapted to slide in said slot for connecting said link to said moving member.

18. In a mechanism of the character described, the combination with a moving part, a movable part and means for limiting the movement of said movable part, of means for transmitting movement from said moving part to said movable part during a portion only of the cycle of movement of said moving part, said transmitting means including a slotted link connected at one end to said movable part and a connecting member mounted on said moving part and adapted to slide in said slot for connecting said link to said moving member.

19. In a mechanism of the character described, the combination with a moving part, a movable part and means for limiting the movement of said movable part, of means for transmitting movement from said moving part to said movable part during a portion only of the cycle of movement of said moving part and means for returning said movable member to starting position, said transmitting means including a slotted link connected at one end to said movable part and a connecting member mounted on said moving part and adapted to slide in said slot for connecting said link to said moving member.

20. In a mechanism of the character described, the combination with a moving part, a movable part and means for limiting the movement of said movable part, of means for transmitting movement from said moving part to said movable part during a portion only of the cycle of movement of said moving part and a spring for returning said movable member to starting position, said transmitting means including a slotted link connected at one end to said movable part and a connecting member mounted on said moving part and adapted to slide in said slot for connecting said link to said moving member.

21. In a mechanism of the character described, the combination with a moving part, a movable part and means for limiting the movement of said movable part, of means for transmitting movement from said moving part to said movable part during a portion only of the cycle of movement of said moving part, comprising a link having a longitudinal slot, one side of which is formed with two straight parallel edges in offset relation to each other to divide said slot into two longitudinal portions of different widths, said parallel edges being connected together by an oblique edge which serves as a shoulder and said side edge being so mounted as to yield to widen the narrower portion of said slot when sufficient pressure is exerted on said shoulder.

22. In a mechanism of the character described, the combination with a moving part, a movable part and means for limiting the movement of said movable part, of means for transmitting movement from said moving part to said movable part during a portion only of the cycle of movement of said moving part, including a link comprising an elongated body portion having a longitudinal recess opening out one side of said body, a bar resiliently mounted on said body portion for closing the open side of said recess to make it a slot, the inner edge of said bar being divided into two straight parallel edges offset in relation to each other to divide said slot into two longitudinal portions of different widths, said edges being connected together by an oblique edge constituting a shoulder.

ARTHUR R. HAVENER.